United States Patent [19]

Lahar et al.

[11] Patent Number: 5,338,132
[45] Date of Patent: Aug. 16, 1994

[54] OIL SPILL CONTAINMENT SYSTEM

[76] Inventors: Donald H. Lahar, 97 White Rock Hill Rd.; Scott B. Lahar, 24 Branch, Londonderry Turnpike East, both of Bow, N.H. 03301

[21] Appl. No.: 824,348

[22] Filed: Jan. 23, 1992

Related U.S. Application Data

[63] Continuation-in-part of Ser. No. 711,141, Jun. 6, 1991, which is a continuation-in-part of Ser. No. 505,836, Apr. 6, 1990, abandoned.

[51] Int. Cl.$^5$ .............................................. E02B 15/06
[52] U.S. Cl. ..................................... 405/69; 405/66; 405/68; 210/923
[58] Field of Search ............ 405/60, 63, 64, 65, 405/66, 68, 211, 69; 210/923

[56] References Cited

U.S. PATENT DOCUMENTS

| | | |
|---|---|---|
| Re. 28,966 | 9/1976 | Blockwick . |
| 1,369,586 | 2/1921 | Whiton . |
| 2,240,567 | 5/1941 | Meacham . |
| 3,026,739 | 3/1962 | Hungerford ...................... 74/368 |
| 3,104,030 | 9/1963 | Howlett .......................... 222/59 |
| 3,183,876 | 5/1965 | Kronhaus ....................... 114/229 |
| 3,599,434 | 8/1971 | Missud .......................... 61/46 |
| 3,611,728 | 10/1971 | Van't Hof ....................... 61/1 F |
| 3,949,877 | 4/1976 | Santoni ......................... 206/519 |
| 4,000,532 | 1/1977 | Nielsen .......................... 9/8 R |
| 4,015,431 | 4/1977 | Ahiko ........................... 61/1 F |
| 4,073,143 | 2/1978 | Preus ........................... 61/1 F |
| 4,076,624 | 2/1978 | Tolan ........................... 210/96 |
| 4,116,007 | 9/1978 | Stagemeyer ..................... 405/66 |
| 4,249,834 | 2/1981 | Bouvier ........................ 405/70 |
| 4,340,321 | 7/1982 | Maheshwary .................... 405/66 |
| 5,002,430 | 3/1991 | Smith .......................... 405/66 |
| 5,051,029 | 9/1991 | Ecker .......................... 405/68 |
| 5,056,957 | 10/1991 | Wood .......................... 405/66 |
| 5,064,310 | 11/1991 | Sullivan ....................... 405/69 |
| 5,066,164 | 11/1991 | Tomosy ........................ 405/66 |
| 5,071,287 | 12/1991 | Wallace ........................ 405/68 |
| 5,071,545 | 12/1991 | Ashtary ........................ 405/66 X |

FOREIGN PATENT DOCUMENTS

01580  8/1980  PCT Int'l Appl. ............... 405/66

*Primary Examiner*—David H. Corbin
*Attorney, Agent, or Firm*—Hayes, Soloway, Hennessey, Grossman & Hage

[57] ABSTRACT

An oil spill containment collar system for aquatic vessels. A deployable floatation collar and apron apparatus automatically surrounds the periphery of the vessel to be contained. This continuous collar only takes a few minutes to become full functional. The collar may be stored either inboard or outboard of the vessel's gunnel about the deck. In the version of the embodiment which stores the collar inboard of the gunnel, the collar is lowered into the water by a gear or spring-torsion driven pivot arms that lift the collar from the deck area and up over the gunnel. the collar is inflated after lowering over the gunnel, encircling the entire vessel, and giving vertical support to an attached apron. In the outboard version, the collar is automatically released from a container and inflated by compressed gas means. The collar is provided with secondary floatation means to ensure its buoyancy. In both versions, the top edge of the apron is maintained level with the surface of the oil spill, by means of the attached and inflatable collar.

40 Claims, 10 Drawing Sheets

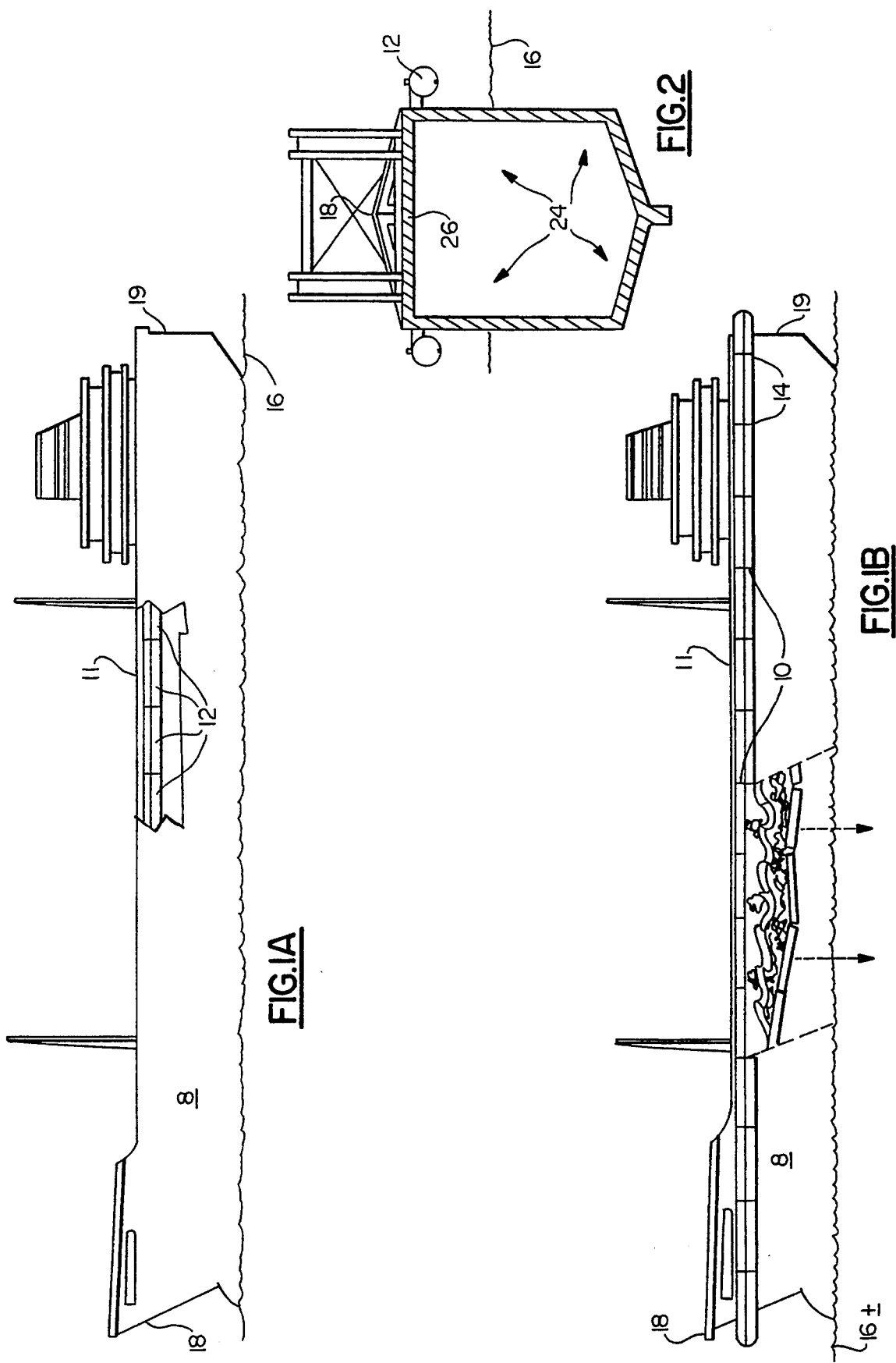

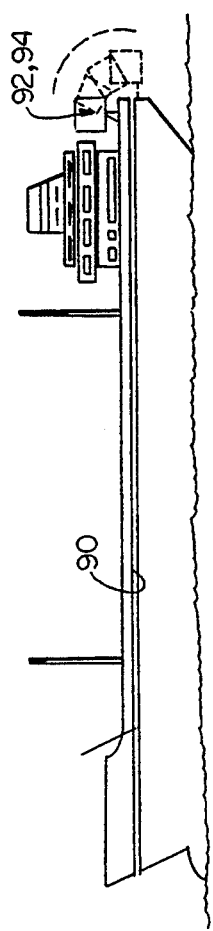
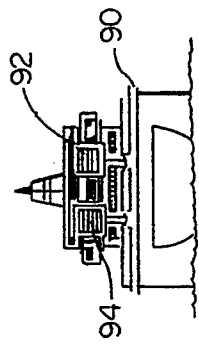
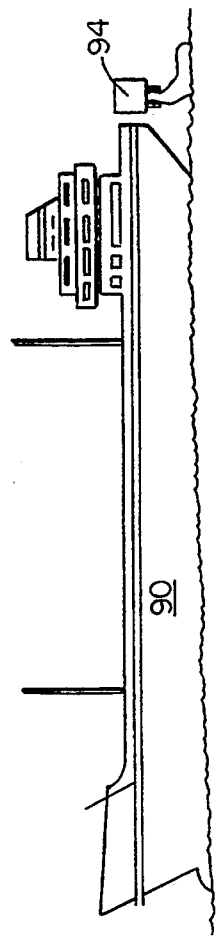
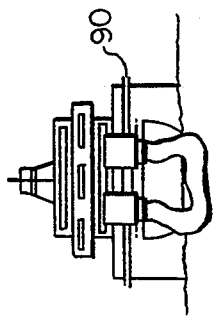
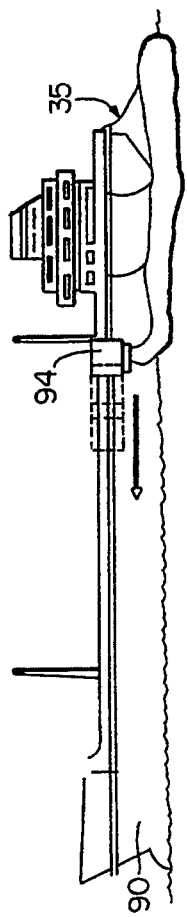
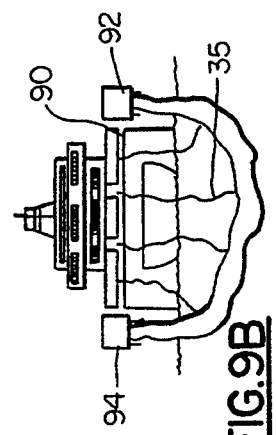

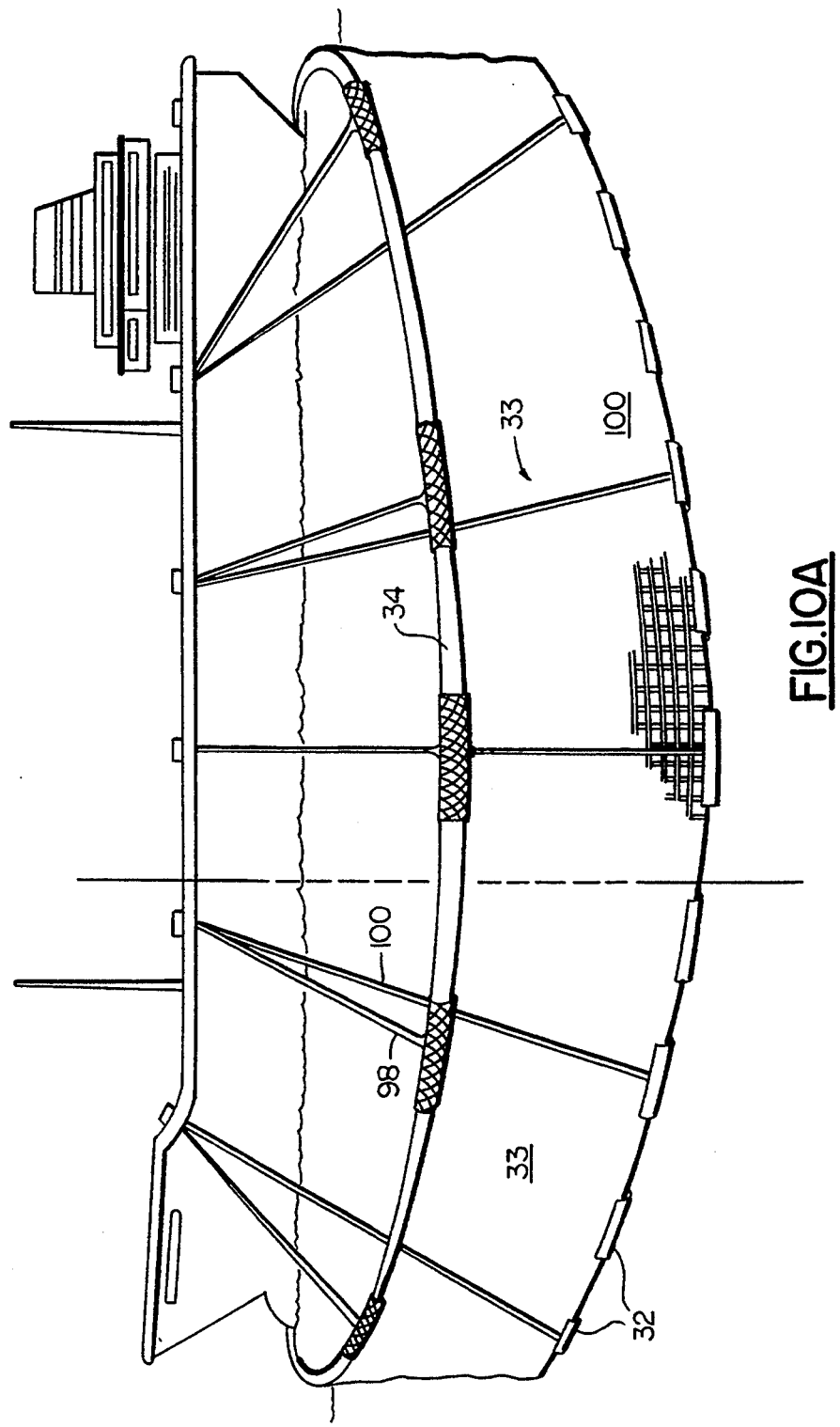

OIL SPILL CONTAINMENT SYSTEM

This application is, in part, a continuation of our co-pending application Ser. No. 07/711,141 filed Jun. 6, 1991 which is, in turn, a continuation-in-part of our abandoned parent application Ser. No. 07/505,836 filed Apr. 6, 1990, now abandoned.

BACKGROUND OF THE INVENTION

1. Field of the Invention

Leakage of ship's oil or spillage of oil tanker cargo has increased in severity and frequency over the years. This is a result of ships gradually changing from coal to fuel oil for propulsion. The increase in oil spillage can also be attributed to a greater number of tankers having a larger capacity to carry oil, which, in turn, allows a greater quantity of oil to be shipped from distant oil fields and refineries, leaving a higher probability of oil spillage.

Large oil spills can cause permanent damage to the aquatic environment. The oil also gets into the aquatic food chain, and directly contaminates fish and shellfish. Estuaries, where various species breed, also become important links in the food chain, have become contaminated. In addition, fish, water foul, and mammals living in the water can face damage and destruction.

There is also the potential for damage to the sea shore, such as beaches and waterfront property. This is due to the accumulation of heavy weight oils, such as crude oil. The only effective way to deal with this situation is to attempt to minimize the quantity of oil spilled.

2. Description of the Prior Art

Various techniques have been devised for controlling the spread of oil spills and removing them from the surface of the water. The following techniques may be relevant to various aspects of the present invention.

Towed barges or self propelled vessels fitted with scoop type skimming structural arrangements have been brought into the region where the spill has occurred and are used to skim the water surface, removing oil therefrom. Depending on the quantity of the oil spilled, the recovered oil can either be stored temporarily on board the recovery vessel or pumped directly to another holding means.

Another method, that can be incorporated with the first method or used by itself, is to deploy a floatation barrier for confining the spread of oil. Aprons of varying depth are attached to the floatation barrier to form a dike that blocks or at least retards the oil from spreading. See Blockwick, U.S. Pat. No. Re 28,966.

Both the first and second techniques require transporting the required containment and recovery equipment to the site of the spill. For spills that occur near coastal areas, a delay of hours to days can be experienced in getting the equipment to the site of the spill. Rapidly shifting tides, currents, and wind driven seas can quickly spread the oil over large areas, rendering it even more difficult or impossible to contain and remove the oil before widespread permanent damage has occurred.

Oil spillage in the open ocean and seaways is essentially impossible to combat, because rescue equipment typically cannot be brought to the site of the spill before the oil is essentially dispersed. Since speed of action is required in minimizing the spread of an oil spill, equipment not immediately available at the spill site cannot be of assistance for this problem.

One prior art attempt which has addressed the aforesaid problem is disclosed in Bouvier, U.S. Pat. No. 4,249,834, which proposes carrying an oil spill containment device, storage tank, pumps, etc., on board the vessel. However, the device proposed by Bouvier is not believed to have been adopted in practice due to the fact that it is impractical to install on a ship, since it hangs over the side and is subject to damage alongside piers and is unprotected from the open ocean environment.

SUMMARY OF THE INVENTION

Pursuant to the features of the present invention, there is provided an oil spill containment system for aquatic vessels that can be stored on board the vessel protected from the environment, lowered into the water by a fulcrum assembly, inflated in the water, able to surround the entire vessel, and capable of being quickly deployed. The system includes means for storing a deployable floatation collar and apron apparatus inboard the gunnel of the vessel. There is a means for raising the collar and apron from the storing means into position on the outboard side of the gunnel, initiating its deployment. A means will lengthen and increase the peripheral dimensions of the collar and apron as they are lowered and deployed in the oil spill. There is a means for controlling the inflation of the collar. Also, at the lower edge of the apron is an anchoring means to keep the apron in a vertical orientation extending from the surface of the oil spill downward throughout its length.

Another aspect of the present invention that is provided is an improved method for controlling an oil spill originating from an aquatic vessel having an oil spill containing apparatus. The improvement includes the steps of storing the oil spill containment apparatus on board the vessel and raising the apparatus outboard from the vessel. The length of the apparatus is increased as it is placed in the water. Next, the apparatus is inflated and then anchored.

Pursuant to another aspect of the present invention, there is provided an improved oil spill containment system of the type having an inflatable collar and depending apron carried by a ship for entraining an oil spill originating therefrom. The improvement includes a plurality of storage means for storing the collar and apron. A tracking means is circumferentially disposed along the ship. There is means for placing the storage containers outboard the ship onto the tracking means. A means for moving the storage containers around the circumference of the ship is used to encircle the ship with the collar and apron. There is a means for inflating the collar as it traverses the ship and there is a means for anchoring the collar and apron.

Still another aspect of the present invention is to provide an improved oil spill containment system that includes an inflatable collar and depending apron for entraining an oil spill originating from a vessel. The system includes a plurality of storage containers for storing a floatation collar and apron inboard the gunnel of the vessel. There is a means for raising the collar and apron from the storage containers moving them into position on the outboard side of the gunnel to initiate its deployment. A means will lengthen and increase the peripheral dimensions of the collar and apron as they are lowered and deployed in the water. There is a means for controlling the inflation of the collars. At the lower edge of the aprons there are anchoring means to keep the aprons in a vertical orientation extending from the surface of the oil spill downward throughout its length.

It is yet still another aspect of the instant invention to provide, in a form of the preferred embodiment, an improved oil spill containment system that includes an inflatable collar and depending apron for entraining an oil spill that originates from a vessel which does not require external inflation means. In this particularly advantageous form of the embodiment of the instant invention, the inflatable collar is capable of being automatically inflated by locally stored compressed gas inflation means. Furthermore, in this form of the embodiment of the instant invention, the inflatable collar comprises secondary floatation means for ensuring that the inflatable collar remains afloat should the primary portion of the collar become deflated or fail to inflate upon deployment.

Yet another aspect of the present invention that is provided is an off-shore oil platform structure of the type having platform supports, a drill casting unit, and a storage unit interposed between the platform and the drill casting unit, in which an oil spill has originated therefrom. The improvement includes storage containers, floatation collars, and aprons on the platform. There is a means for raising the collar and apron from the storage containers and moving them into the water to initiate deployment. A means will lengthen and increase the peripheral dimensions of the collar and apron as they are lowered and deployed in the water. There is a means for inflating the collars. At the lower edge of the apron there is an anchoring means to keep the apron in a vertical orientation extending from the surface of the oil spill downward throughout its length.

Other features of the present invention will become apparent as the following description proceeds and upon reference to the drawings.

BRIEF DESCRIPTION OF THE DRAWINGS

FIG. 1a is a side elevational view of a vessel with an oil spill containment system made in accordance with a preferred embodiment of the present invention, and illustrating the oil spill containment system in stowed position;

FIG. 1b is a view similar to FIG. 1a, and illustrates the oil spill containment system deployed over the vessel's gunnel;

FIG. 2 is an end view cross section of the vessel of FIG. 1b;

FIG. 7a is a side elevational view of a vessel with an oil spill containment system in the beginning stage of deployment along the automated channel track.

FIG. 7b is an end view cross-section of the vessel of FIG. 7a.

FIG. 8a is a side elevational view of a vessel with an oil spill containment system being deployed in the water.

FIG. 8b is an end view cross-section of the vessel of FIG. 8a.

FIG. 9a is a side elevational view of a vessel with an oil spill containment system traversing the circumference of the ship from stern to bow.

FIG. 9b is an end view cross-section of the vessel of FIG. 9a.

FIG. 10a is a side elevational view of a vessel with an oil containment system having a plurality of interconnected collars and aprons.

FIG. 10b is an end view cross-section of the vessel of FIG. 10a.

FIG. 12a depicts a perspective view of another form of the interconnected tubes used for holding the form of the inflatable collar shown in FIG. 11.

FIG. 12b is a cross-sectional view of a portion of the interconnected tubes shown in FIG. 12a.

Figure 3A:
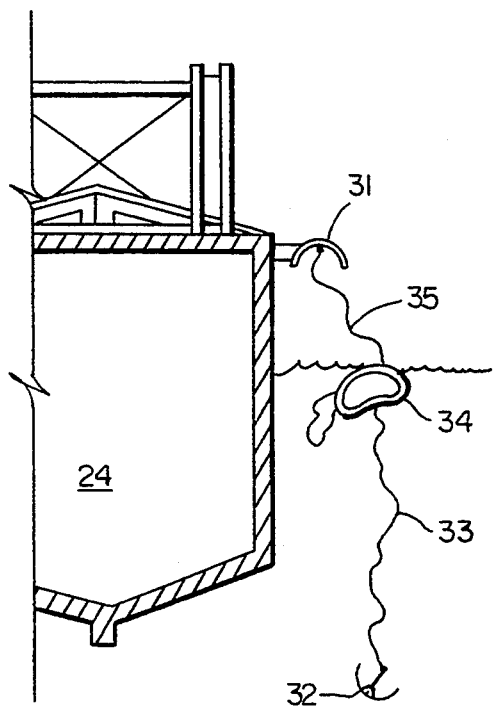
FIG. 3a is an end view similar to FIG. 2, and illustrating the oil spill recovery system of the present invention just after it is being released for deployment.

While the present invention will hereinafter be described in connection with a preferred embodiment and method of use, it will be understood that it is not intended to limit the invention to this embodiment. On the contrary, it is intended to cover all alternatives, modifications and equivalents as may be included with the spirit and scope of the invention as defined by the appended claims.

DESCRIPTION OF THE PREFERRED EMBODIMENTS

The invention, as disclosed in FIG. 1a, 1b, is an oil spill containment system (10), which is designed to be a self-contained, able to be stored on-board, and deployed and operated on a sea-going ship or vessel (8). The system (10) comprises an inflatable collar (34) and an apron (33) that are stored in a series of interconnected tubes (12) encircling the vessel. The tubes (12) are mechanically joined and preferably have watertight seals between the segments (14). The interconnected tubes (12) are stored on the deck area (11) when not deployed, and encircle the ship from bow (18) to stern (19). The interconnected tubes act as storage containers by storing the inflatable collar and apron. The tubes are cylindrically shaped and are formed into two longitudinally mating and sealable halves.

FIG. 2 illustrates the location of the interconnected tubes (12) when lifted off the deck (11) prior to being lowered into the water (16). Also, a representative oil recovery storage compartment (24) is shown in the hull of the vessel (8).

The upper half (31) and lower half (32) of the interconnected tubes are shown partially deployed in FIG. 3a. The bottom half of the interconnected tube (32) is connected to the lower end of the apron (33) and acts as an anchor to keep the apron in a vertical orientation with respect to the water and to the collar. A partially inflated floatation collar (34) has been dropped from the upper half of the interconnected tube (31) into the water. The floatation collar (34) is attached by a guide line (35) to the upper half of the interconnected tube (31) and to the upper end of the apron (33).

Figure 3B:
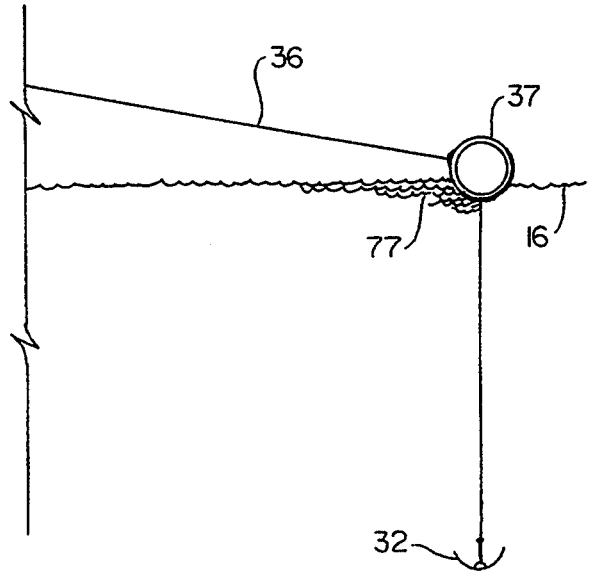
FIG. 3b is a view similar to FIG. 3a, and illustrates the oil spill recovery system of the present invention fully deployed.

Inflating the collar (34) causes the guide lines (35) to extend and position the deployed apron (33) around the oil spill. As shown in FIG. 3b, the bottom half of the interconnected tube (32) holds the extended apron (33) vertically in place. The inflated collar (34) maintains the upper edge of the apron (33) above the surface of the water (16) and above any oil spilled on the surface of the water.

Figure 3C:
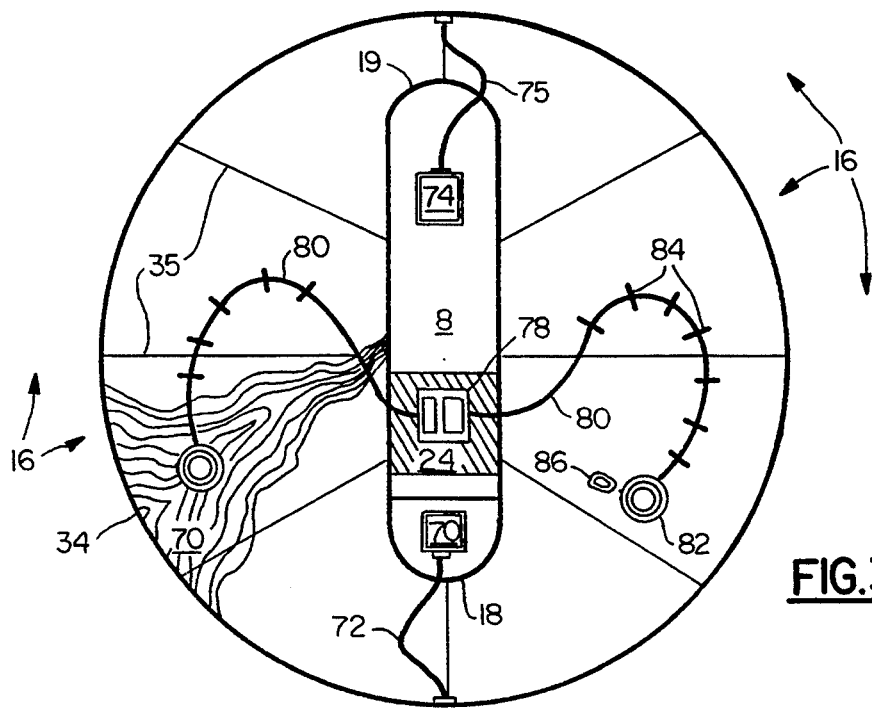
FIG. 3c is a top plan view of the vessel of FIG. 1a, and illustrates a deployed inflated collar fully encircling the vessel.

FIG. 3c is a top view of a vessel (8) encircled with a fully inflated collar (34). The extended guide lines (35) position the inflated collar (34) approximately equally distanced and symmetrically about the vessel (8). The inflation collar (34) is inflated by a forward inflation pump (70) located on the vessel (8) at the bow (18). Pump (70) is connected to the inflation collar (34) via an inflation line (72). A second inflation pump (74) and inflation line (75) may be located at the stern (19) of the vessel (8). Pumps (70) and (74) inflate collar 34 until a predetermined amount of air pressure is delivered to the collar. The pumps may be any conventional high volume pump capable of delivering a nominal amount of air pressure to the collar and inflation lines 72 and 75 may be any conventional air flow control valves.

The inflated collar (34) and apron (33) retain the oil spilled from the vessel (8) from reaching the water (16) external to the collar (34) and apron (33). The spilled oil (77) can be immediately taken on board the vessel (8) by means of a plurality of oil recovery lines (80), connected to one or more oil recovery pumps (78). Spilled oil is pumped back on board and can be stored in oil compartment (24) designated for that purpose, or the oil may be pumped back into the ruptured oil compartment. As long as the pump capacity is greater than the oil loss flow, this will result in a reduced quantity of oil on the water at any point in time. The suction pump (78) may be placed in various different locations of the vessel. For instance, suction pump (78) may be placed in the same location as inflation pumps (70) and (74) to maximize efficiency of the oil recovery system. In this configuration, the high volume pump could be controlled to provide either air or suction, depending on what is desired. The oil recovery line 80 includes air-filled floatation pods (84), multi-intake oil recovery pads (82) and raft (86). The raft (86) is lowered from the vessel and is connected to the multi-intake pad (82). The raft is then used to position the pad to the site of the oil spill (77). The multi-intake pads (82) will pump back the oil on board the vessel through the air-filled floatation pods (84). There may be more than one suction pump (78) and oil recovery line (80) used in the present invention. In order to maximize efficiency, a pump (78) and oil recovery line (80) may be placed at both the bow and stern adjacent to inflation pumps (70) and (74).

Figure 4:
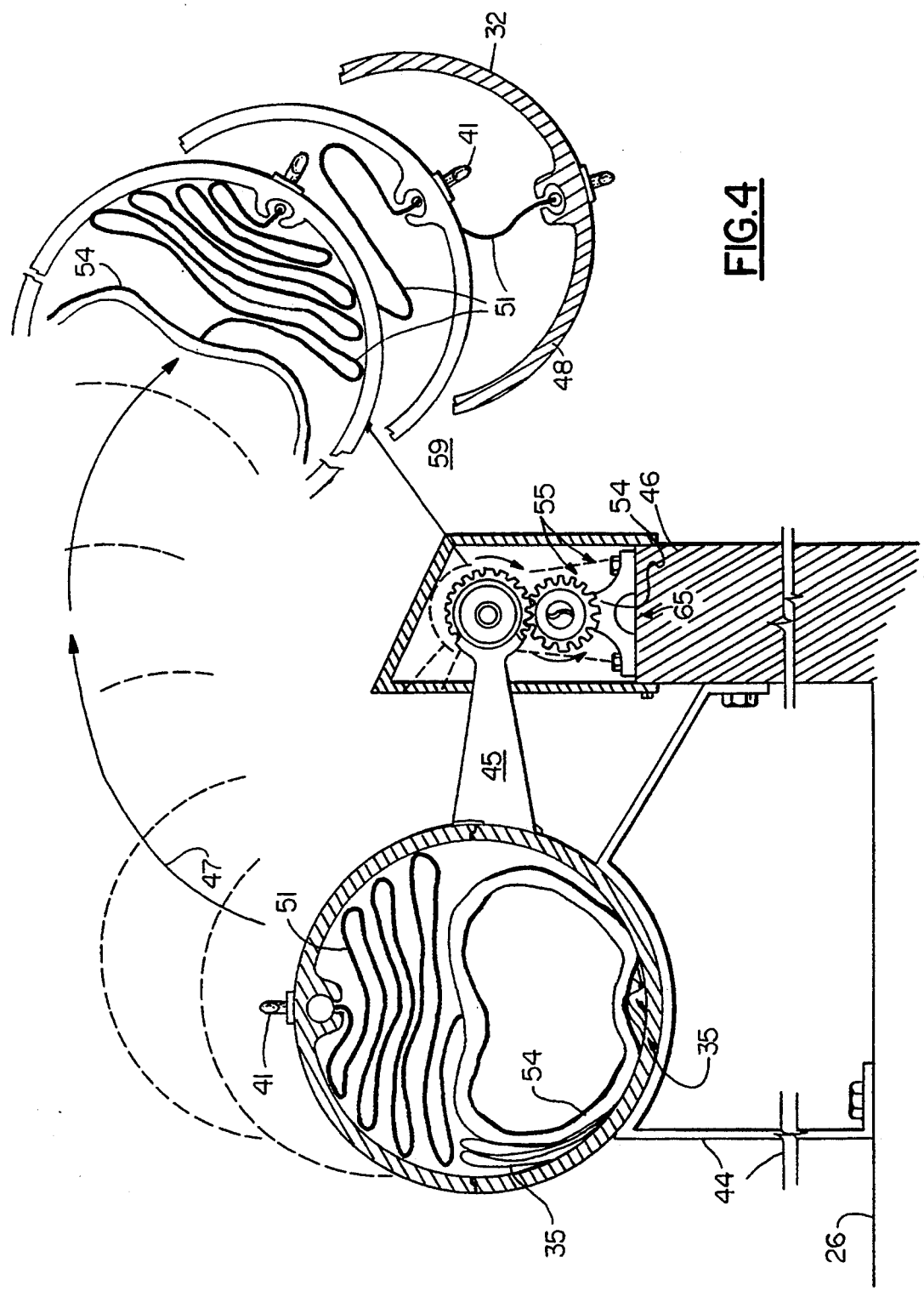
FIG. 4 is a side elevational view, in cross section, and illustrating gear driven fulcrum arm deployment system of the present invention.

As shown in FIG. 4, the interconnected collar tubes (12) are stored on the vessel's deck (11) when not in use. Lifting rings (41) are located at the ends of each segmented tube (12), and are available for moving the tubes into place on cradle units (44). A rubber seal (43) is placed between the upper (31) and lower (32) halves of the collar storage tube (12) at the segment separation point (50) to protect the oil containment apparatus from inclement weather. The inflation collar (34) and apron (33) are shown inside the closed upper (31) and lower (32) halves of the storage tube. The lower half of the interconnected tube (32) may be removed by lifting ring (41). This allows one to inspect the inflatable collar (34), the apron (33), and the guide line (35) or so that one can reload with the same.

The interconnected storage tubes are stored in a cradle (44), located on the vessel's deck (11). The height of the cradle (44) may vary depending on the particular vessel's dimensions. Fulcrum arms (45) are energized by motorized drives (56) and drive gear unit (48).

The oil spill containment system (10) of the present invention is deployed by pivoting the interconnected tube (12), by a fulcrum arm (45) fixed to the upper half (31), from the cradle unit (44) on the deck (11) through path (47) into position outboard of the vessel's gunnel (46). Once in place, the upper (31) and lower (32) halves of the interconnected tube will part at the segment separation point (50). As shown in FIGS. 3a, b, the loose guide lines (35) retain the partially inflated collar (34) to the upper half of the interconnected tube (31). The apron (33) is attached to the collar (34) at the bottom half of the interconnected tube (32). The partially inflated collar (34) is shown in FIG. 3a, while the fully inflated collar and deployed apron is shown in FIG. 3b.

FIG. 4 shows a side view of the fulcrum arm (45) gear drive unit (48) consisting of a power drive gear (54), a gear locking clevis (55) and a fulcrum arm stop (49) for the gear end of fulcrum (45). The power drive gear (54) actuates the fulcrum arm (45) into deployment.

Figure 5:
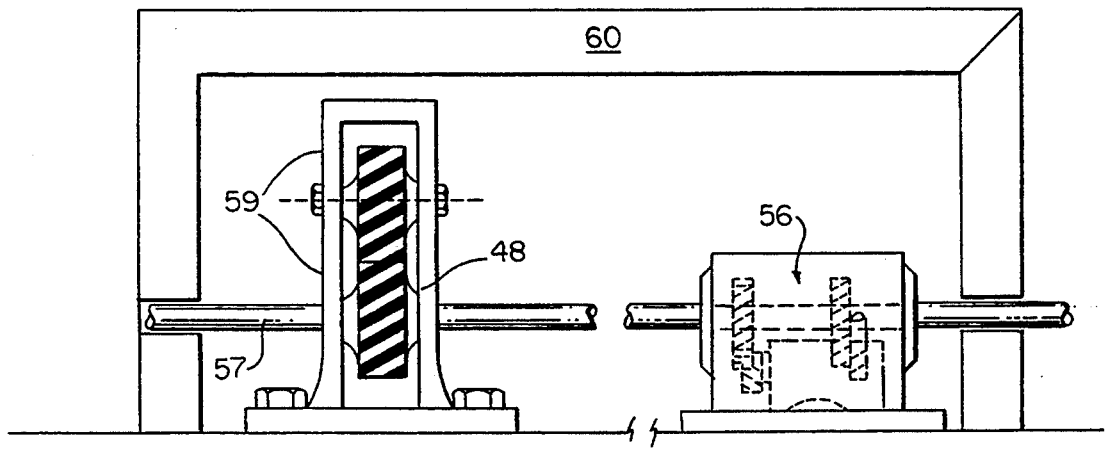
FIG. 5 is a front plan view in cross section of the gear driven fulcrum arm deployment system of FIG. 4.

A front section view of the fulcrum drive gear unit (48) is shown in FIG. 5. The motorized fulcrum drive (56) is coupled via an output drive shaft (57) to the clevis unit (59). A gear box cover (60) preferably seals the drive unit from moisture and weather.

Figure 6:
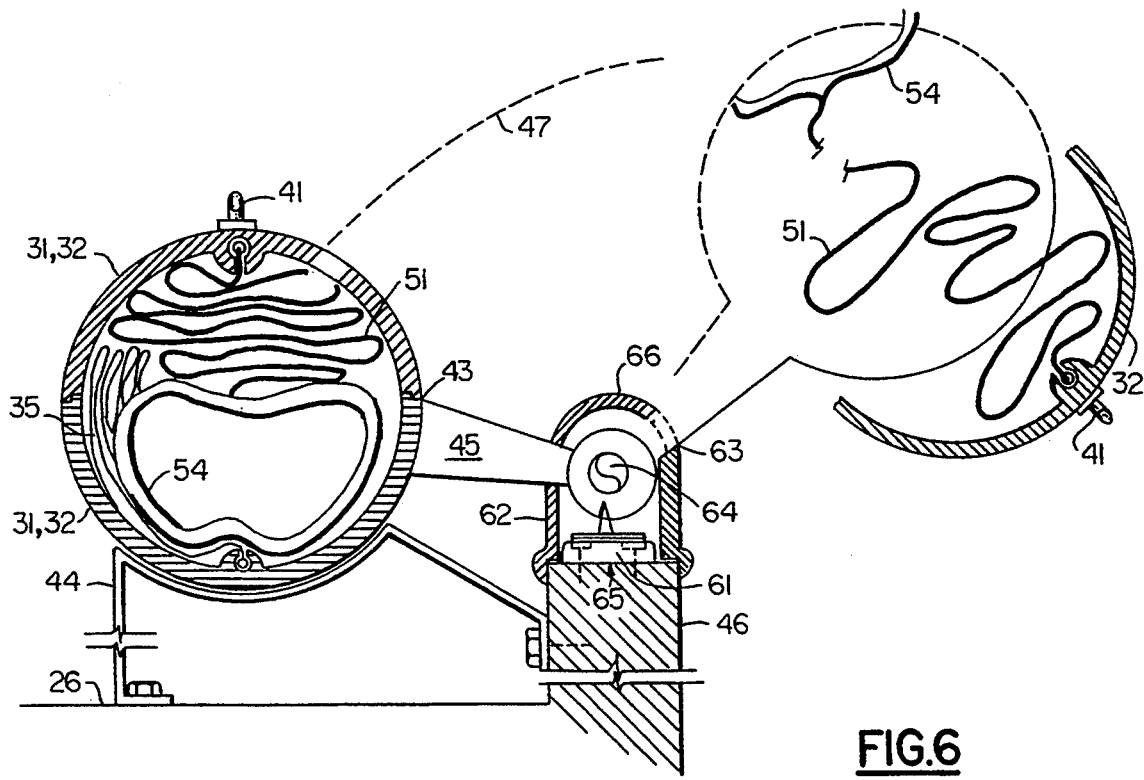
FIG. 6 is a side plan view in cross section of an alternative form fulcrum arm deployment system and employing a torsion bar drive unit in accordance with another embodiment of the present invention.

An alternative means of energizing the fulcrum arm is by means of a torsion bar (64) as illustrated in FIG. 6. An electronic holding magnet release (61) is used to control the actuation of the fulcrum arm (45). A fulcrum arm stop (63) limits the arm's pivot motion (47). A pivot mechanism cover (62) permits access to the torsion bar area (64).

The balance of the floatation collar and apron assembly as illustrated in FIG. 4 is utilized in the configuration of FIG. 6.

FIGS. 7-13 show various forms of the preferred embodiment of the present invention.

FIGS. 7-9 illustrate a vessel having an oil spill containment system carried on a tracking means circumferentially disposed around a ship. The channel track (90) is disposed circumferentially along the vessel's gunnel. Motive means (not shown) is used to move the oil spill containment system along the track (90) circumferentially around the vessel.

Figure 7C:
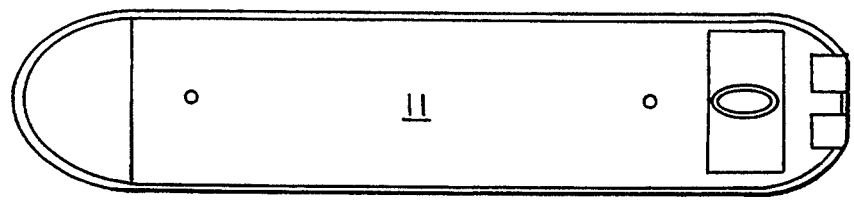
FIG. 7c is a top view showing the oil containment system stored inboard.

FIG. 7a shows a side elevational view of the vessel (8) which has a channel track (90) and storage containers (92) and (94) in a storage mode. Within the storage containers are a floatation collar (34), an apron (33) and guide lines (35). In the present invention, the storage containers are shown at the stern, but may be placed in the bow as well. FIGS. 7b and 7c respectively, show an end view of the cross-section of the vessel and a top view.

Figure 8C:
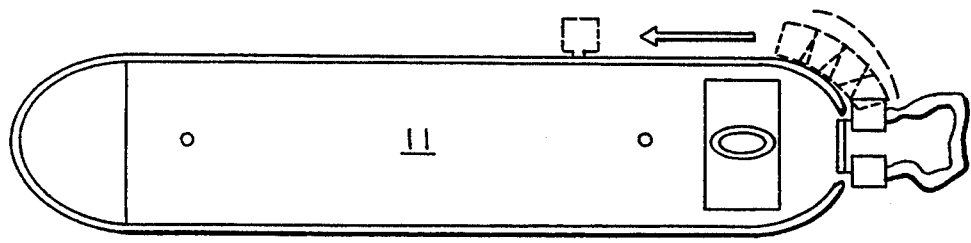
FIG. 8c is a top view showing the oil containment system being deployed in the water.

FIG. 8a illustrates a side elevational view of the vessel as the oil spill containment system is deployed in the water. The storage containers (92) and (94) are moved outboard the vessel by a fulcrum mechanism as shown in FIGS. 4-6 and described hereinbefore, and placed on track (90). As storage containers (92) and (94) are placed outboard vessel (11) and onto track (90), floatation collar (34), apron (33), and guide lines (35) are released from the storage containers and are placed in the water. FIGS. 8b and 8c respectively show an end view of the cross-section of the vessel and a top view.

Figure 9C:
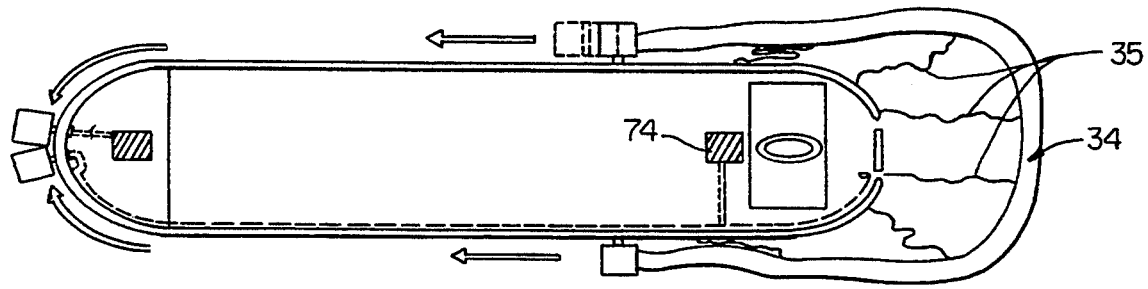
FIG. 9c is a top view showing a typical path of the oil containment system as it traverses from stern to bow.

FIG. 9a shows a side elevational view of the vessel as the oil spill containment apparatus traverses its circumference. Storage containers (92) and (94), each holding a floatation collar (34), an apron (33) and guide lines (35), traverse the port and starboard sides on the track to meet at the bow. Track (90) may be either a single channel track or a double channel track. The storage containers may be moved along the channel track manually or by conventional mechanical or electrical modes. The leading ends of the floatation collars (34) are coupled together with air-tight locks, and the edges of apron (33) are brought together with continuous electromagnets placed thereon. As the oil spill containment system traverses the vessel, the collars are inflated by air pumps (70) and (74) in accordance with the method described hereinbefore. As the collars are inflated, the oil spill containment system increases peripherally away from the vessel, causing guide lines (35) to extend until the system evenly surrounds the vessel. The inflated collar (34) and apron (33) retain the oil spilled from the vessel and prevent any oil from reaching water external to the oil spill containment system. To keep the apron in a vertical orientation extending from the surface of the oil spill down throughout its length, a weight is placed at the bottom of the apron. The spilled oil is pumped on board the vessel by oil recovery lines (80) schematically shown in FIG. 3c and described hereinbefore. FIGS. 9b and 9c respectively show an end view of the cross-section of the vessel and a top view.

Figure 10B:
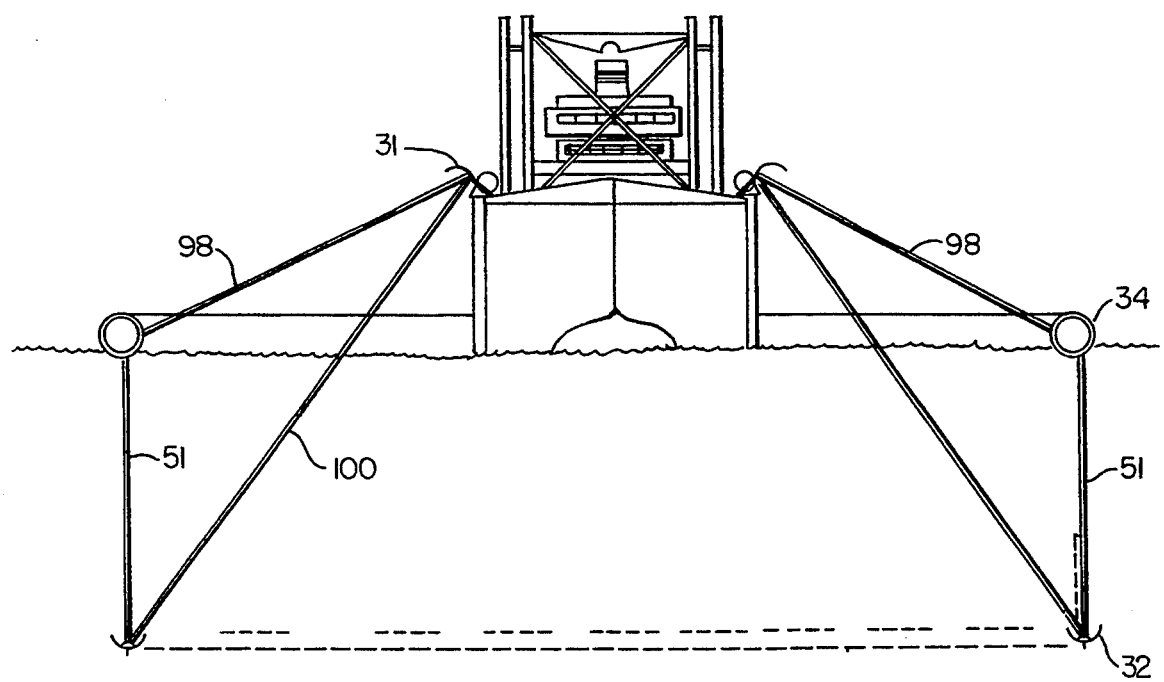

FIGS. 10a-10b illustrate a vessel having an oil spill containment system that utilizes a plurality of interconnected floatation collars and aprons. Storage containers (96) are placed at various locations throughout the vessel's deck. Within each storage container are interconnected collars and a depending apron with upper and lower control cables (98) and (100) connected to the collar and apron. The storage containers are placed outboard the vessel's gunnel by a fulcrum mechanism shown in FIGS. 4-6 and described hereinbefore. The segmented collars and apron are then placed into the water. The segmented collars are inflated by air pumps (70) and (74) in accordance with the method described hereinbefore. As the collars are inflated, the oil spill containment system increases peripherally from the vessel, causing the upper and lower control cables (98) and (100) to extend until the system evenly surrounds the vessel. The upper and lower control cables (98) and (100) are respectively connected to the collar and apron by self-tightening basket-weave cable retainers (102). The cable retainers (102) ensure that the cables (98) and (100) are well-secured and can withstand the worst water currents. The aprons are weighted at the bottom to keep the apron in a vertical orientation extending from the surface of the oil spill down throughout its length. The weights are the top half of the storage container (32) which were shown in FIGS. 3a, 3b, 4 and 6, and described hereinbefore. To add further stability, lead weights (104) can be incorporated into the apron if necessary. The apron (33) may be made from any semipermeable membrane material that allows water to pass, but not oil. This inflated collar and apron retains the oil spilled from the vessel and prevents any oil from reaching water external to the oil spill containment system. The spilled oil is pumped on board the vessel by oil recovery lines (80) schematically shown in FIG. 3c and described hereinbefore. FIG. 10b shows an end view of the cross-section of the vessel.

Figure 11:
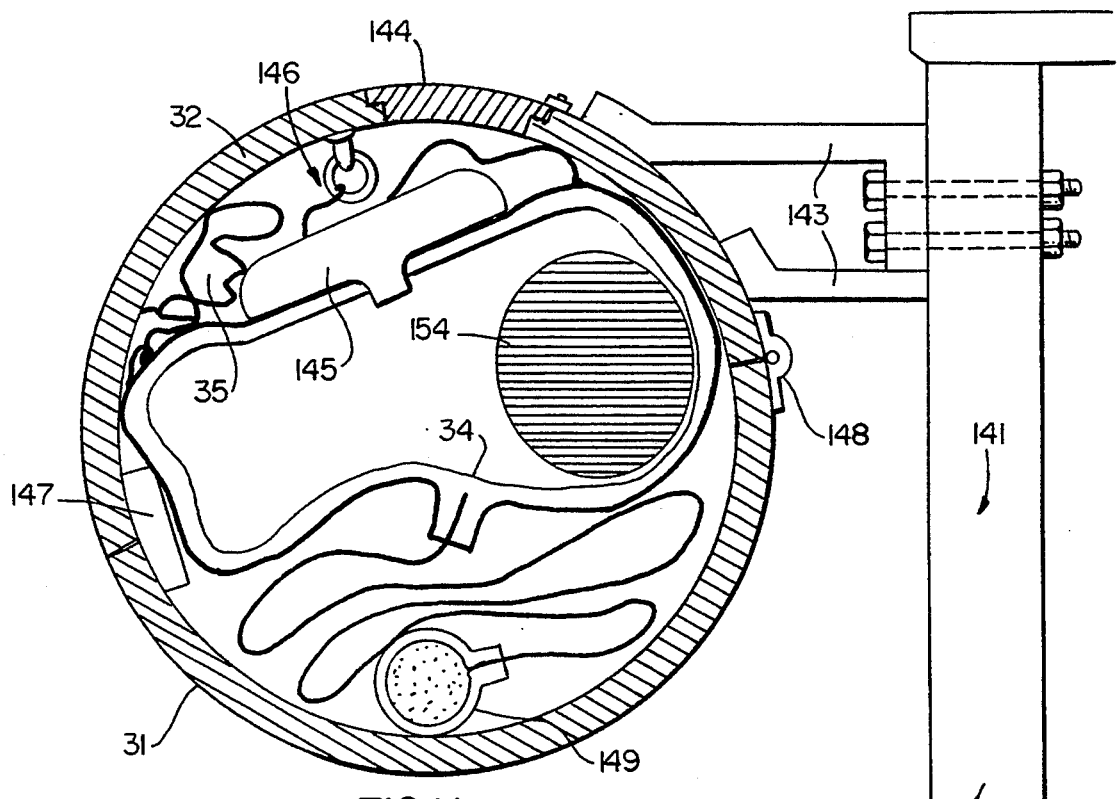
FIG. 11 depicts a cross-sectional view of the inflatable collar and secondary floatation means includes in another form of the preferred embodiment of the instant invention.

Turning now to FIG. 11, another particularly advantageous form of the preferred embodiment of the present invention is depicted. The upper half section of the holding tube (32) is attached directly to the vessel by bracket (143) to the vessel's sidewall (141). The lower half section (31) is attached via hinge (148) to the upper half section of the holding tube. when the deployment of the oil containment system is necessary, an automatic activation mechanism (147) is activated separating the lower half (31) from the upper half, thereby allowing the apron weight (149) to begin deployment downward of the collar (34) toward the water. As the inflatable collar (34) is pulled downward, the compressed gas canister (145), which may contain compressed carbon dioxide gas, is activated by the release action of a pull ring and leash (146). An important advantage of the present form of the embodiment is that, in the event of the malfunction of a compressed gas canister, the buoyancy of the secondary floatation device (154) will be maintained. the relevant sections of the inflatable collar will continue to float and, thereby, the oil spill being contained by the containment collar will not be able to escape.

Figure 12:
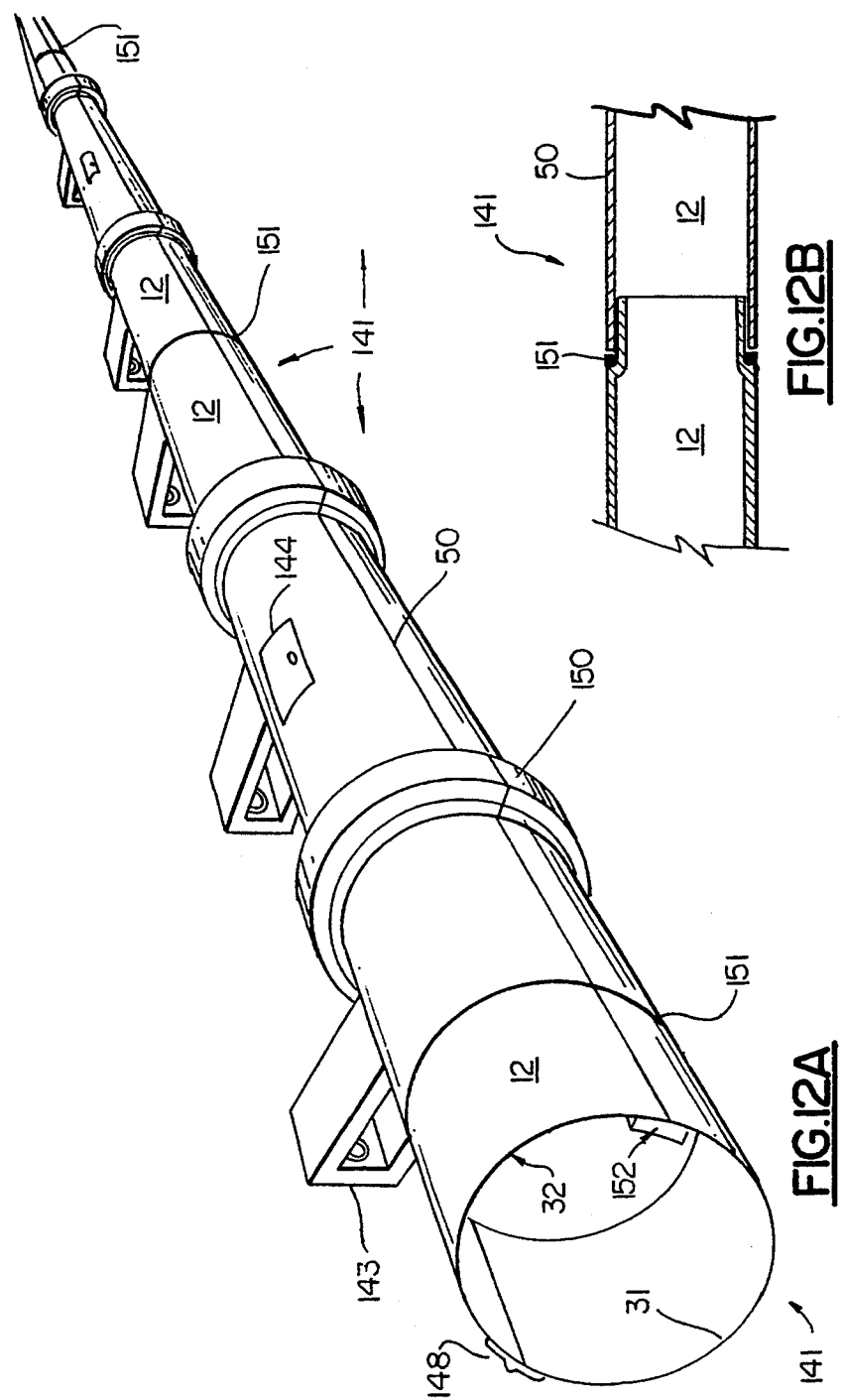

FIG. 12 depicts a perspective view of holding tube sections (12), which, for example, may be made of stainless steel. These sections preferrably are connected to the vessel's sidewall (141) by brackets (143) and each section (12) is joined by a slip collar and sealed. An important element of this form of the holding tube is use of inspection doors (144) in each section. Advantageously, preventive maintenance may be performed on the compressed gas canisters by using these inspection doors (144). Preferrably, the sections are reinforced by cylindrical rings (150) to maintain tube strength. As previously detailed, the tubes are hinged (148) at the back and are separated by the activation of the automatic release system (152).

Figure 13:
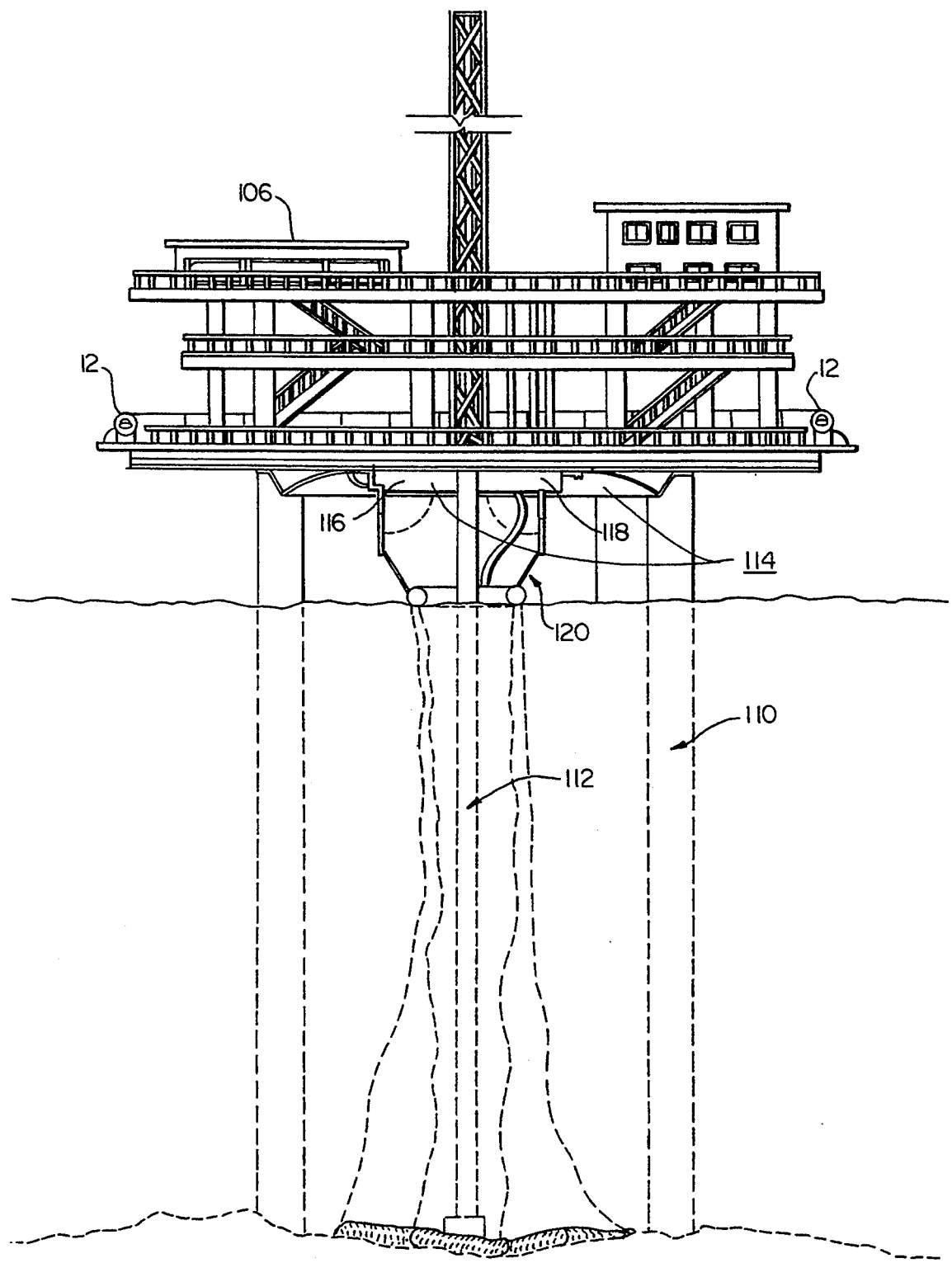
FIG. 13 is a side elevational view of the oil containment system deployed in an oil drilling platform.

FIG. 13 illustrates a side elevational view of the oil containment system deployed around an oil drilling platform (106). The oil drilling platform includes platform supports (108) and (110), drill casting unit (112), and a storage unit (114) interposed between the platform and the drill casting unit. On the platform are two storage tubes (12), each holding a floatation collar (34), an apron (33), and cable guides (35). The tubes are cylindrically shaped and are formed into two longitudinally mating and sealable halves. The bottom half of the interconnected tube 32 is connected to the lower end of the apron (33) and acts as an anchor keeping the apron in a vertical orientation with respect to the water and to the collars while the upper half is connected to the collar. To deploy the storage tubes 12, the tubes are raised from the platform 106 and placed in the water by the fulcrum mechanism described herein. The floatation collars and apron are inflated by high volume air pumps described herein. As the collars are inflated, the oil spill containment system increases peripherally from the platform, causing guide (35) to extend until the system evenly surrounds the platform. The aprons are weighted at the bottom to keep the apron in a vertical orientation extending from the surface of the oil spill down throughout its length. The weights are the top half of the storage container (32) which were shown in FIGS. 3a, 3b, 4 and 6 and described hereinbefore. To add further stability, lead weights (104) can be incorporated into the apron if necessary. The apron (33) may be made from any semi-permeable membrane material that allows water to pass, but not oil. This inflated collar and apron retains the oil spilled from the plat-form and prevents any oil from reaching water external to the oil spill containment system. The spilled oil is pumped on board the platform by oil recovery lines (80) schematically shown in FIG. 3c and described hereinbefore.

To add an extra measure of prevention, an oil spill containment system is deployed around the drill casting unit (112). The storage unit (114) is divided into two compartments (116) and (118), each having a collar, a depending apron, and a guide placed therein. To deploy this system, the compartments (116) and (118) are opened and the collar, apron and guide from each compartment are lowered into the water. The floatation collar and apron are inflated by high volume air pumps described herein. As the collars are inflated, the oil spill containment system increases peripherally until it evenly surrounds the drill casting unit. To add further stability in the water, a control cable (120) connects the drill casting unit (112) to each collar. At the bottom of each apron are weights keeping the apron in a vertical orientation throughout its length. This inflated collar and apron retains any oil spilled from drill casting unit (112) and prevents any oil from reaching water external thereof.

As will be appreciated by one skilled in the art, the present invention provides a number of advantages over the prior art. The invention permits rapid deployment of the oil containment system so that an oil spill may be captured at the site of the spill to minimize the damage to the environment. The invention also has the advantage that the deployment mechanism can be tested periodically by partially activating the fulcrum arm drive mechanism, i.e. to test the lift. This is an important feature and advantage in view of the long term service expected for a typical tanker. Also, the storage tubes protect the oil spill containment system from environmental deterioration which is also an important feature and advantage.

It is, therefore, evident that there has been provided, in accordance with the present invention, an oil spill containment system that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications, and variations as fall within the spirit and broad scope of the appended claims.

We claim:

1. In an oil spill containment system which includes an inflatable collar and depending apron having an upper and lower edge carried by a vessel for entraining an oil spill originating therefrom, wherein the inflatable collar and depending apron when deployed form a continuous circular oil containment apparatus surrounding the vessel, means for inflating the collar once deployed to maintain the upper edge of the depending apron at the surface of the oil spill in a vertical orientation extending downward from the collar, the collar and apron being constructed of a plurality of interconnected segments of uniform length, means for weighting down and anchoring the lower edge of the apron to maintain the positioning of the collar and apron once inflated and deployed in the water, means for removing the entrained oil spill from the surface of the surrounding water, and means for storing the oil retrieved, the improvement which comprises:

means for storing the oil containment apparatus on board the vessel, said storing means being inboard the vessel's gunnel, and, comprising a cylindrical structure formed into two longitudinally mating and sealable halves, the half closest to the deck being secured to support members that are rotatably affixed to the gunnel and the other half being attached to the oil spill containment apparatus;

means for controllably rotatably raising the oil containment apparatus from said storing means and moving the apparatus into position on the outboard side of the gunnel in preparation for deployment while imparting momentum thereto;

means for functionally lengthening and increasing the oil containment apparatus, said lengthening means increases the peripheral dimension of the apparatus as it is raised from the deck and moved out over the outboard side of the gunnel;

means for predeterminally controlling the inflation of the plurality of interconnected segments, during the full deployment cycle, from the onboard stored position to floating in the oil spill; and means for anchoring the plurality of interconnected segments, said anchoring means being flexibly attached to the lower edge of the aprons of each interconnected segment and keeping each of the aprons in a vertical orientation extending from the surface of the oil spill downward throughout its length.

2. In an oil spill containment system as claimed in claim 1, the improvement wherein the means for raising the oil containment apparatus comprises of a fulcrum mechanism having a plurality of pivotable arms attached to said storing means, which controllably raise and swing the oil containment apparatus over the gunnel and outboard the side of the ship.

3. In an oil spill containment system as claimed in claim 1, the improvement wherein at least one of the plurality of interconnected segments is separable from said plurality of segments to permit lengthening of said apparatus, allowing the oil spill containment apparatus to be extracted for subsequent deployment.

4. In an oil spill containment system as claimed in claim 1, the improvement wherein the inflation means comprises a high volume pump and plurality of air flow control valves connected thereto, for supplying high volume air to each collar of the interconnected segments.

5. In an oil spill containment system as claimed in claim 1, the improvement wherein said anchoring means comprises the half section of said storing means, which is flexibly attached to the lower edge of the extended apron about the periphery, said half section being weighted for keeping the apron submerged and held in a vertical position, said anchoring means having a cross-sectional profile approximating a semicircle.

6. In a method for controlling an oil spill from a vessel which carries an on-board oil containment system, wherein the oil containment system includes an inflatable collar and depending apron having an upper and lower edge deployed to entrain an oil spill originating from the vessel, wherein the inflatable collar and depending apron form a continuous circular oil containment apparatus surrounding the vessel, means for inflating the collar to maintain the upper edge of the depending apron at the surface of the oil spill in a vertical orientation extending downward from the collar, the oil containment apparatus having a plurality of interconnected segments of uniform length that act as a continuous barrier to dispersion of the oil spill, the lower edge of the dependent apron weighted down and anchored to maintain the positioning of the collar in the water, the entrained oil spill being removed from the surface of the surrounding water and subsequently transported to an onboard compartment or adjacent barge for storage of the oil retrieved, wherein the improvement comprises:
storing the oil containment apparatus on board the vessel in storing means comprising a cylindrical structure formed into two longitudinally mating and sealable halves, the half closest to the deck of the vessel being secured to support members that are rotatably affixed to the gunnel and the other half being attached to the oil spill apparatus, whereby the apparatus is stored inboard the vessel's gunnel;
rotatably raising the oil containment apparatus from the deck and moving the apparatus into position on the outboard side of the gunnel in preparation for deployment while imparting momentum thereto;
lengthening and thereby increasing the peripheral dimension of the containment apparatus as it is raised from the deck and moved out over the outboard side of the gunnel;
predeterminally controlling the inflation of the plurality of interconnected segments, during the full deployment cycle, from the onboard stored position to flotation in the oil spill; and
anchoring the inflated interconnected segments once deployed, keeping each apron in a vertical orientation extending from the surface of the oil spill downward throughout its length.

7. In a method as claimed in claim 6, the improvement which comprises at least one of the plurality of interconnected segments being separable from said plurality of segments to permit lengthening of said apparatus, allowing the oil containment apparatus to be extracted for subsequent deployment.

8. In a method as claimed in claim 6, the improvement which comprises inflating the interconnected segments to a predetermined pressure by means of a high volume pump and plurality of air flow control valves connected thereto for supplying high volume air to each collar of the interconnected segments.

9. In an oil spill containment system of the type having an inflatable collar and depending apron carried by a ship for entraining an oil spill originating therefrom, the improvement which comprises:
means for tracking the oil spill containment system around the ship, said tracking means being circumferentially disposed along the ship;
at least two storage means for storing the collar and apron on board the ship, whereby the collar and apron are permanently attached to said storage means;
means for deploying said storage means into position on the outboard side of the gunnel, whereby each of said storage means are placed on said tracking means and the collar and apron therein are released into the water;
means for moving said storage means around the circumference of the ship wherein the collar and apron traverse the ship until the collar and apron surround the ship;
means for inflating the collar during the deployment of the oil spill containment system to the water; and
means for anchoring the collar and apron, said anchoring means keeping the apron in a vertical orientation extending from the surface of the oil spill downward throughout its length and being flexibly attached to the apron.

10. In an oil spill containment system as claimed in claim 9, the improvement wherein said tracking means includes a double track channel.

11. In an oil spill containment system as claimed in claim 9, the improvement wherein said tracking means includes a single track channel.

12. In an oil spill containment system as claimed in claim 9, the improvement wherein cable tie lines are secured to the collar and may be attached to said tracking means to provide further stability.

13. In an oil spill containment system, which includes an inflatable collar and depending apron having an upper and lower edge carried by a ship for entraining an oil spill originating therefrom, wherein the inflatable collar and depending apron when deployed form a continuous circular oil containment apparatus surrounding the ship, means for inflating the collar once deployed maintaining the upper edge of the depending apron at the surface of the oil spill in a vertical orientation extending downward from the collar, the collar and apron being constructed of a plurality of interconnected modular segments of uniform length, means for weighting down and anchoring the lower edge of the apron to maintain the positioning of the collar and apron once inflated and deployed in the water, means for removing the entrained oil spill from the surface of the surrounding water, and means for storing the oil retrieved, the improvement which comprises:
a plurality of storage containers placed inboard the ship's gunnel, said storage containers containing the oil containment apparatus;
means for controllably raising the oil containment apparatus from said plurality of storage containers and moving the apparatus into position on the outboard side of the gunnel placing the apparatus in the water;
means for functionally lengthening and increasing the peripheral dimension of the oil containment apparatus as it is placed in the water;
means for predeterminally controlling the inflation of the oil containment apparatus as it is placed in the water; and
means for anchoring the oil containment apparatus, said anchoring means being flexibly attached to the lower edge of the apron, keeping the apron in a vertical orientation extending from the surface of the oil spill downward throughout its length.

14. In an oil spill containment system as claimed in claim 13, the improvement wherein said plurality of storage containers each comprises a cylindrical structure formed into two longitudinally mating and sealable halves, wherein one half is secured to support members that are pivotably affixed to the gunnel and the other half containing the oil containment apparatus.

15. In an oil spill containment system as claimed in claim 14, the improvement wherein said lengthening means is comprised of an upper and lower cable adapted to be attached to the oil containment apparatus and the half of said storage containers affixed to the gunnel.

16. In an oil spill containment system as claimed in claim 15, the improvement wherein said upper cable is attached to the collar and said lower cable is attached to said anchoring means.

17. In an oil spill containment system according to claim 13, the improvement wherein said raising means is comprised of a fulcrum assembly having a plurality of pivotable arms attached to said plurality of storage containers, which controllably raise and swing the oil containment apparatus over the gunnel and outboard the side of the ship.

18. In an oil spill containment system as claimed in claim 13, the improvement wherein said inflation means provide a source of high volume air to the oil containment apparatus.

19. In an oil spill containment system as claimed in claim 14, the improvement wherein said anchoring means is comprised of the half containing the oil containment apparatus that is flexibly attached to the lower edge of the apron, said anchoring means having a cross-sectional profile of a semicircle.

20. In an off-shore oil platform structure of the type having platform supports, a drill casting unit, and a storage unit interposed between the platform and the drill casting unit, in which an oil spill has originated from the platform, wherein the improvement which comprises:
   at least one storage container carried on the platform, each of said containers containing an inflatable collar and a depending apron having an upper and lower edge for surrounding the platform;
   means for raising each of said storage containers from the platform and moving the collar and apron into the water;
   means for lengthening and increasing the peripheral dimension of the collar and apron as it is placed into the water forming a continuous circular oil containment device surrounding the platform;
   means for inflating the collar as it is placed into the water; and
   means for anchoring the apron, keeping it in a vertical orientation extending from the surface of the oil spill downward throughout its length and being flexibly attached to the lower edge of the apron.

21. In an off-shore oil platform as claimed in claim 20, the improvement wherein each of said storage containers each comprised of a cylindrical structure formed into two longitudinally mating and sealable halves, wherein one half is secured to support members that are pivotably affixed to the platform and the other half containing the collar and depending apron.

22. In an off-shore oil platform as claimed in claim 21, the improvement wherein said lengthening means is comprised of an upper and lower cable adapted to be attached to the collar and apron and the one half of said storage containers affixed to the platform.

23. In an off-shore oil platform as claimed in claim 20, the the improvement wherein the apron incorporates lead weights therein to keep the apron in a vertical orientation extending from the surface of the oil spill downward throughout its length.

24. In an off-shore oil platform as claimed in claim 23, the improvement wherein the apron is made from a semi-permeable membrane allowing water to pass, but not oil.

25. In an off-shore oil platform as claimed in claim 20, the improvement wherein said raising means is comprised of a fulcrum assembly having a plurality of pivotable arms attached to storage containers, which controllably raise and swing the collar and apron over the platform into the water.

26. In an off-shore oil platform as claimed in claim 20, the improvement wherein said inflation means provide a source of high volume air to the collar.

27. In an off-shore oil platform as claimed in claim 20, the improvement wherein said anchoring means is comprised of the half containing the collar and apron being flexibly attached to the lower edge of the apron and having a cross-sectional profile of a semicircle.

28. In an off-shore oil platform as claimed in claim 20, the improvement wherein the storage unit is divided into a first and second compartment, said first and second compartments being separated by the drill casting unit and each having a collar and depending apron placed therein.

29. In an off-shore oil platform as claimed in claim 28, the improvement which comprises means for opening said first and second compartments.

30. In an off-shore oil platform as claimed in claim 29, the improvement which comprises means for lowering each collar and apron from said first and second compartments into the water forming a continuous circular oil containment apparatus device surrounding the drill casting unit.

31. In an off-shore oil platform as claimed in claim 30, the improvement wherein said lowering means is comprised of a guide cable extending from each of said first and second compartments to its depending collar.

32. In an off-shore oil platform according to claim 31, the improvement wherein each collar is stabilized in the water by a control cable extending from the drill casting unit to the collar.

33. In an oil spill containment system that includes a boom having an inflatable collar and depending apron having an upper and lower edge carried by a ship for entraining an oil spill originating therefrom, the inflatable collar and depending apron forming, when deployed, a continuous circular oil containment apparatus surrounding the ship, means for inflating the collar once deployed thereby maintaining the upper edge of the depending apron at the surface of the oil spill in a vertical orientation extending downward from the collar, the collar and apron being constructed of a plurality of interconnected modular segments of uniform length, means for weighting down and anchoring the lower edge of the apron to maintain the positioning of the collar and apron once inflated and deployed in the water, means for removing the entrained oil spill from the surface of the surrounding water, and means for storing the oil retrieved, the improvement which comprises:
   a plurality of storage containers placed outboard the ship's gunnel, said storage containers containing the oil containment apparatus;
   means for placing said oil containment system into the water;
   means for functionally lengthening and increasing the peripheral dimension of said containment apparatus as it is placed in the water;

means for automatically inflating said collar as it is being placed into water;

secondary floatation means independent from said collar, for ensuring the buoyancy of said boom; and means for anchoring said containment apparatus, said anchoring means being flexibly attached to the lower edge of said apron, keeping said apron in a vertical orientation extending from the surface of the oil spill downward throughout its length.

34. In an oil spill containment system as claimed in claim 33, the improvement wherein said plurality of storage containers each comprises a cylindrical structure formed into two longitudinally mating and sealable halves, wherein half is secured to support members that are affixed to the gunnel and the other half containing the oil containment apparatus.

35. In an oil spill containment system as claimed in claim 34, the improvement wherein at least one of said two halves includes a plurality of inspection openings, whereby it is possible to inspect said containment apparatus.

36. In an oil spill containment system as claimed in claim 34, the improvement wherein said automatic inflation means comprises a compressed gas container and means for causing the gas contained within said gas container to be released into said inflatable collar.

37. In an oil spill containment system as claimed in claim 34, the improvement wherein said releasing means includes a pullring and leash activation system.

38. In an oil spill containment system as claimed in claim 37, the improvement, wherein said compressed gas container is a carbon dioxide canister.

39. In an oil spill containment system as claimed in claim 34, the improvement wherein said cylindrical structure further includes hinge means joining said two halves at a first longitudinal joint between said two halves, thereby forming a longitudinal joint between said two halves, an an automatic release mechanism, whereby it is possible to separate said two halves from each other at a second longitudinal separation between said two halves while maintaining the connection between said two halves at said joint.

40. In an oil spill containment system as claimed in claim 33, the improvement wherein said secondary floatation means comprises a buoyant cylinder.

* * * * *